(12) United States Patent
Le Fevre et al.

(10) Patent No.: US 7,827,578 B2
(45) Date of Patent: Nov. 2, 2010

(54) METHOD AND APPARATUS FOR PROVIDING SIMPLIFIED PEER-TO-PEER RECORDING

(75) Inventors: Chad Andrew Le Fevre, Indianapolis, IN (US); Mark Gilmore Mears, Zionsville, IN (US); James Duane Tenbarge, Fishers, IN (US); Bret David Hawkins, Brownsburg, IN (US)

(73) Assignee: Thomson Licensing, Boulogne Billancourt (FR)

( * ) Notice: Subject to any disclaimer, the term of this patent is extended or adjusted under 35 U.S.C. 154(b) by 291 days.

(21) Appl. No.: 10/578,952

(22) PCT Filed: Nov. 9, 2004

(86) PCT No.: PCT/US2004/037349

§ 371 (c)(1),
(2), (4) Date: May 10, 2006

(87) PCT Pub. No.: WO2005/048595

PCT Pub. Date: May 26, 2005

(65) Prior Publication Data

US 2007/0124751 A1 May 31, 2007

Related U.S. Application Data

(60) Provisional application No. 60/518,899, filed on Nov. 10, 2003.

(51) Int. Cl.
*H04N 5/445* (2006.01)
(52) U.S. Cl. .......... 725/59; 725/131; 725/141; 725/153; 386/40; 386/124

(58) Field of Classification Search .......... 725/87, 725/89, 59; 386/95–96, 125–126
See application file for complete search history.

(56) References Cited

U.S. PATENT DOCUMENTS 5,371,551 A * 12/1994 Logan et al. .......... 348/571

(Continued)

FOREIGN PATENT DOCUMENTS

EP  1 499 069 A  1/2005

(Continued)

OTHER PUBLICATIONS

Search Report dtd. Mar. 15, 1005.

*Primary Examiner*—Andrew Y Koenig
*Assistant Examiner*—Junior O Mendoza
(74) *Attorney, Agent, or Firm*—Robert D. Shedd; Paul P. Kiel

(57) ABSTRACT

A television apparatus having digital serial bus ports allows a user to select a user-designated digital video content source input such as a digital tuner of the television apparatus and digital serial bus compliant components connected to the television apparatus via the digital serial bus ports of the television apparatus, and to cause digital content from the user-designated digital content source device to be recorded onto a digital recording device connected to the television apparatus via the digital serial bus ports. The present invention allows a user to continuously record digital content onto a digital recording device (e.g. an AVHDD), whether from the TV's digital tuner or from another digital serial bus compliant device in a peer to peer arrangement. The connection is always recording, but allows the user to select or designate a digital (i.e. MPEG2) source (i.e. the TV tuner or another digital serial bus compliant device), in addition to displaying the selected content.

16 Claims, 4 Drawing Sheets

U.S. PATENT DOCUMENTS

| | | | | |
|---|---|---|---|---|
| 5,883,621 | A * | 3/1999 | Iwamura | 725/37 |
| 6,442,328 | B1 * | 8/2002 | Elliott et al. | 386/46 |
| 6,707,508 | B1 * | 3/2004 | Mears et al. | 348/731 |
| 6,788,882 | B1 * | 9/2004 | Geer et al. | 386/116 |
| 7,039,936 | B1 * | 5/2006 | Inoue et al. | 725/59 |
| 7,199,835 | B2 * | 4/2007 | Takano et al. | 348/558 |
| 7,289,482 | B2 * | 10/2007 | Jang et al. | 370/341 |
| 7,305,504 | B2 * | 12/2007 | Hong et al. | 710/104 |
| 7,409,480 | B2 * | 8/2008 | Hata et al. | 710/104 |
| 7,448,060 | B2 * | 11/2008 | Takano et al. | 725/80 |
| 7,596,640 | B2 * | 9/2009 | Sakai | 710/31 |
| 2003/0037335 | A1 * | 2/2003 | Gatto et al. | 725/86 |
| 2003/0075983 | A1 * | 4/2003 | Stecyk et al. | 307/38 |
| 2003/0202776 | A1 * | 10/2003 | Kendall et al. | 386/94 |
| 2006/0204208 | A1 * | 9/2006 | Mears et al. | 386/46 |
| 2006/0291799 | A1 * | 12/2006 | Mears et al. | 386/83 |

FOREIGN PATENT DOCUMENTS

| | | |
|---|---|---|
| WO | WO 01/89224 A | 11/2001 |
| WO | WO 02/32140 A | 4/2002 |

* cited by examiner

METHOD AND APPARATUS FOR PROVIDING SIMPLIFIED PEER-TO-PEER RECORDING This application claims the benefit, under 35 U.S.C. §365 of International Application PCT/US2004/037349, filed Nov. 9, 2004, which was published in accordance with PCT Article 21(2) on May 26, 2005 in English and which claims the benefit of U.S. provisional patent application No. 60/518,899 filed Nov. 10, 2003.

This U.S. non-provisional patent application claims the benefit of U.S. provisional patent application Ser. No. 60/518, 899 filed Nov. 10, 2003, entitled "Method And Apparatus For Providing Simplified Peer-To-Peer Recording", which is specifically incorporated herein by reference.

BACKGROUND OF THE INVENTION

1. Field of the Invention

The present invention involves a television apparatus and/or system for allowing a user of a display device, such as a television apparatus, having digital serial bus ports to select digital content from a designated digital input source connected to the television apparatus and continuously record the digital content into a digital recording device connected to the television apparatus.

2. Background Information

Users today expect more out of their home entertainment systems than their older counterpart home entertainment systems. For years, users have been able to record standard analog broadcasts via a VCR. In recent years, hard drive based systems have allowed the user to record a digital copy of an analog broadcast, as well as allowing the user to play the track back while it is being recorded. Devices that do this are currently only being used to record analog broadcasts, but there is a desire to have the same functionality with digital broadcasts.

Digital broadcasts lend themselves to this sort of functionality, since there is no need to digitize the data. A user may record a perfect copy of what is coming to him over the high definition (HD) tuner onto a digital medium. Devices such as TiVo™ and ReplayTV™ are known for encoding and recording data onto a hard disk drive. These units pioneered the concept of a personal video recorder or PVR, which allows a user to "pause live TV". Particularly, these units let the user pause, rewind, fast forward, frame advance, and select many other functions commonly known as "trick modes" on a TV program that the user is currently watching. They do this by recording the content and playing it back at least slightly delayed from the real content. The delay in playback occurs because the content is first buffered before it is processed and displayed. If the user rewinds or pauses the show, then the playback remains that far behind the current TV show (or live TV). These devices give the user the option to switch back to live TV whenever the user desires, but the concept of "live TV" now means one or two seconds delayed due to the constant recording that is being done in the background.

Certain HDTVs (high definition televisions), such as the DM2CR based products manufactured by Thomson, Inc. of Indianapolis, Ind., allow the user to connect an external AVHDD (Audio-Video Hard Disk Drive) via a digital serial bus such as the IEEE 1394 digital serial bus, which a user can use to gain PVR-type functionality. This is not a PVR in the sense described above, since the user has to initiate any recordings (i.e. the AVHDD is not continuously recording all content). Also, the DM2CR HDTV only allows digital content from the TV's tuner to be recorded. Moreover, a user must initiate and stop the recording.

A line of HDTVs by Mitsubishi allows for the recording of one digital serial bus device to another serial bus device, but does not allow the user to operate these devices as a PVR. Particularly, the user sets up timed recordings from a menu while the television initiates and ends the recording in the background.

It is thus evident from the above that what a user really wants is the ability to record digital data directly from a satellite or cable box to a hard drive disk unit connected to the television apparatus.

It is thus also evident from the above that what is needed is a television that can cause recording of digital data from any digital data source connected to the television onto a hard disk drive component connected to the television.

It is thus further evident from the above that what is needed is a television that can cause recording of digital data from any digital data source connected to the television onto a hard disk drive component and simultaneously displayed on the television.

These needs and others are met through application of the principles of the subject invention as embodied in one or more various forms and/or structures such as are shown and/or described herein.

SUMMARY OF THE INVENTION

A television apparatus having digital serial bus ports allows a user to display digital content from a user-designated digital content source input such as a digital tuner of the television apparatus and digital serial bus compliant components connected to the television apparatus via the digital serial bus ports of the television apparatus, and to continuously record the digital content from the user-designated digital content source to a digital recording device connected to the television apparatus via the digital serial bus ports.

In one form, the present invention provides a method for operating a television apparatus having digital serial bus ports. The method comprises: (a) receiving user selection of a designated video input source device connected to the television apparatus via the digital serial bus ports; and (b) causing a digital recording device connected to the television apparatus via the digital serial bus ports to continuously record the digital content from the designated video input source in response to the user selection.

In another form, the present invention provides a television apparatus. The television apparatus comprises: (a) means for receiving user selection of a designated video input source device connected to the television apparatus via digital serial bus ports of the television apparatus; and (b) means for causing a digital recording device connected to the television apparatus via the digital serial bus ports to continuously record the digital content from the designated video input source in response to the user selection.

The present television apparatus includes a PVR mode that, when enabled via an on-screen menu, provides for the continuous recording of digital content from a digital tuner of the television apparatus to a hard disk drive component connected to a digital serial bus port of the television apparatus, preferably in a predefined block size. The digital content is buffered to the hard disk drive in a "loop" fashion. Therefore, whenever the user is tuned to a digital channel on the television apparatus tuner, the hard drive disk will be recording the data in addition to allowing the display thereof. Once the data has filled the predefined buffer size, it will begin to overwrite the previous data in the buffer, thus making the recording a loop.

Moreover, the television apparatus is operable to provide for the display and continuous recording of digital content from a digital serial bus compliant component connected to the television apparatus via a digital serial bus port thereof, when such is designated as the digital input source. This is achieved via a peer-to-peer connection. The television apparatus will initiate a connection directly between the recordable digital serial bus compliant device (e.g. an IEEE 1394 compliant satellite or cable box) and a digital serial bus compliant hard disk drive recorder component (e.g. an AVHDD). The television apparatus does not participate in the data exchange between the two devices, but will still be able to control each of the devices (e.g. issuing channel changes on the satellite/cable box and starting/stopping the recording on the hard disk drive recorder component).

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
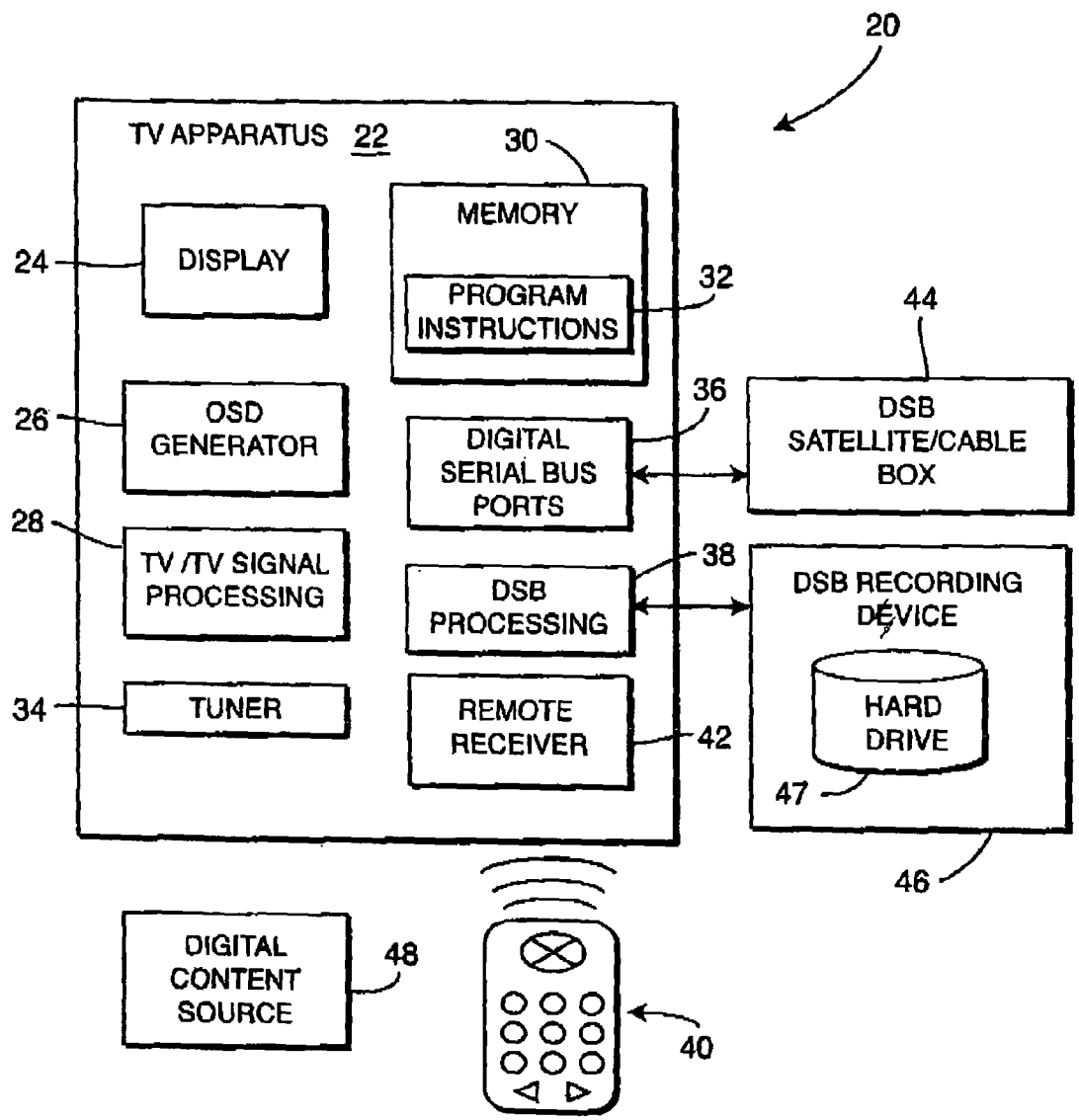
FIG. 1 is a simplified block diagram of an exemplary system in which the present invention may be embodied.

Corresponding reference characters indicate corresponding parts throughout the several views. Although the drawings represent embodiments of the invention, the drawings are not necessarily to scale and certain features may be exaggerated in order to better illustrate and explain the invention. The exemplifications set out herein illustrate various embodiments of the invention, but such exemplifications are not to be construed as limiting the scope of the invention in any manner.

DESCRIPTION OF THE PREFERRED EMBODIMENT

The embodiment disclosed herein is not intended to be exhaustive or limit the invention to the precise form disclosed so that others skilled in the art may utilize its teaching.

FIG. 1 illustrates an exemplary system 20 incorporating and/or operable according to the principles of the present invention. Being exemplary, the system 20 represents the many physical embodiments of a system and/or television apparatus operable in accordance with the principles of the present invention.

The system 20 of FIG. 1 includes a television apparatus 22 having basic functionality and/or features consistent with typical televisions/television apparatus as well as the present functionality/features described herein in accordance with the present principles. As such, the television apparatus 22 is operable, configured and/or adapted to process digital television signals, digital audio/video (A/V) content and/or the like (collectively, digital content), as well as analog television signals and/or analog audio/video (A/V) content and/or the like (collectively, analog content) from various input sources available for the television 22. The television apparatus 22, however, may process only digital content.

In addition to processing and playing content, the television apparatus 22 is also configured, adapted and/or operable to display text, graphics, pictures or the like, particularly for on-screen menus, messages and/or the like in accordance with the principles of the present invention. The television apparatus 22 also accepts user input for controlling the television apparatus 22, accessing various interactive and/or non-interactive menus for user selection of menu choices, television defaults, and/or the like such as are known in the art. The television apparatus 22 is further operable to display one or more menus or user selectable options in response to user input and/or television system signals, and accept user input for user selection of user choices/options, particularly of selection of television mode (such as a PVR mode discussed herein), selection of a designated digital content input source to the television apparatus 22 for recording the digital content thereof to a digital content recorder connected to the television apparatus 22, and for selecting the digital content recorder.

The television apparatus 22 includes a display 24 and television signal processing and feature/function control unit 28 for functioning in the manner(s) described herein. The television apparatus 22 accepts user input via a remote controller 40 that transmits user initiated input signals to a remote control signal receiver 42. The remote/remote receiver 40/42 may utilize IR, RF or other transmission means. The remote controller 40 is used to provide input with respect to menu options or choices, as well as for typical remote features such as, but not limited to, channel change inputs, volume control inputs, transport command inputs, settings inputs, and/or the like.

The television apparatus 22 also includes an on-screen display (OSD) generator 26 that is operable to provide the graphics, text and/or the like necessary to provide the on-screen menus on the display 24. The television apparatus 22 also includes television signal processing 28 that is operable, configured and/or adapted to process digital television signals such as MPEG2 digital signals. The television signal processing 28 may also provide analog television signal processing if the television apparatus 22 supports analog television signals. The television signal processing 28 also provides television apparatus control of the various television apparatus components, features and/or functions of the television apparatus 22. The television apparatus 22 further includes memory 30 storing program instructions 32. The program instructions 32 are used by the television apparatus 22 (i.e. the television processing 28 and the digital serial bus processing 38) for operation of the television apparatus 22 in accordance with the present principles.

The television apparatus 22 includes a tuner 34 that is operable to receive digital content from a tunable digital content source 48. Additionally, the television apparatus 22 includes digital serial bus ports 36 for connection and communication with one or more digital serial bus (DSB) compliant devices or components. The digital serial bus compliant devices or components may be a digital recording device 46 having a hard disk drive 47, a digital satellite or cable box 44 or the like. While only one digital recording device and one digital content source is shown, it should be appreciated that there may be more than one of each or either device.

The satellite/cable box 44 represents one or more digital serial bus compliant digital content sources that is selectable by the user. The digital recording device 46 represents one or more digital content recording devices that is selectable by the user.

In accordance with the principles of the present invention, the television apparatus 22 has a personal video recorder (PVR) mode that provides PVR functionality. Particularly, when enabled by the user, the television provides for the display of a digital video content from the user-selected digital video content source on the display 24 as well as the continuous recording of the digital video content from the digital video content source onto the user-selected digital video content recorder 46. The recording device 46 is preferably, an audio/video heard disk drive unit (AVHDD) such as a DVR10 manufactured by Thomson, Inc. of Indianapolis, Ind. Thus, while the user is watching the digital content from the selected input source, the same digital content is being recorded by the recording device 46. The recording device 46 may be selected by the user for viewing.

In accordance with an aspect of the subject invention, the digital video content is buffered into the recording device 46 up to a predefined amount (a predefined block size). When the PVR feature is enabled, digital video content is buffered to the hard disk of the recording device. Once this data has filled the predefined buffer size, it will begin to overwrite the previous data in the buffer, thus making the recording a loop. By default, the digital content from the tuner is continuously recorded into the recording device. However, when the input source is changed to a input source, previous buffering will stop and the digital content from the currently selected source device will be buffered.

In accordance with the invention, the television apparatus may initiate a connection directly between the recording device and the recordable device (e.g. cable box) or input signal source. The television thus establishes a peer-to-peer connection between the user-selected digital video content source and the digital recording device. The television apparatus need not participate in the exchange of the digital video content between the two devices, but may provide control commands thereto.

Preferably, the digital serial bus is an IEEE 1394 digital serial bus and the peripherals (i.e. digital satellite/cable box 44 and digital recording device 46) are IEEE 1394 compliant devices. The processing element 38 would thus perform IEEE 1394 processing. Thus the television apparatus 22 provides for PVR functionality over the IEEE 1394 bus by establishing a connection between an IEEE 1394 compliant recordable device and an IEEE 1394 compliant recording device.

Figure 2:
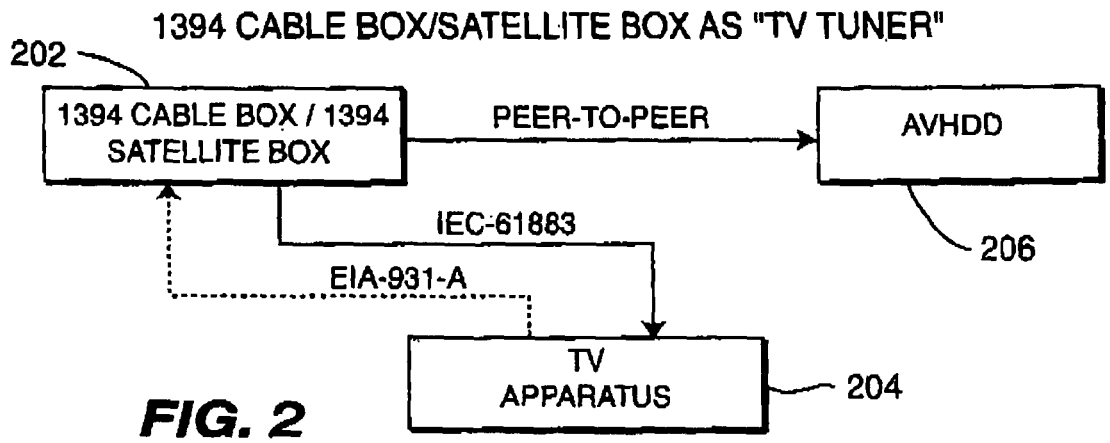
FIG. 2 is a block diagram illustrating the use of an IEEE 1394 compliant cable/satellite box as a TV tuner in accordance with the principles of the present invention.

FIG. 2 illustrates a situation where the cable/satellite box 202 is the TV tuner (digital content input source). The television apparatus 204 establishes a peer-to-peer connection between the IEEE 1394 compliant cable/satellite box 202 and an AVHDD 206. The EIA-931-A arrow represents the IEEE 1394 connection, and the IEC-61883 arrow represents the audio/video equipment digital interface protocol.

Figure 3:
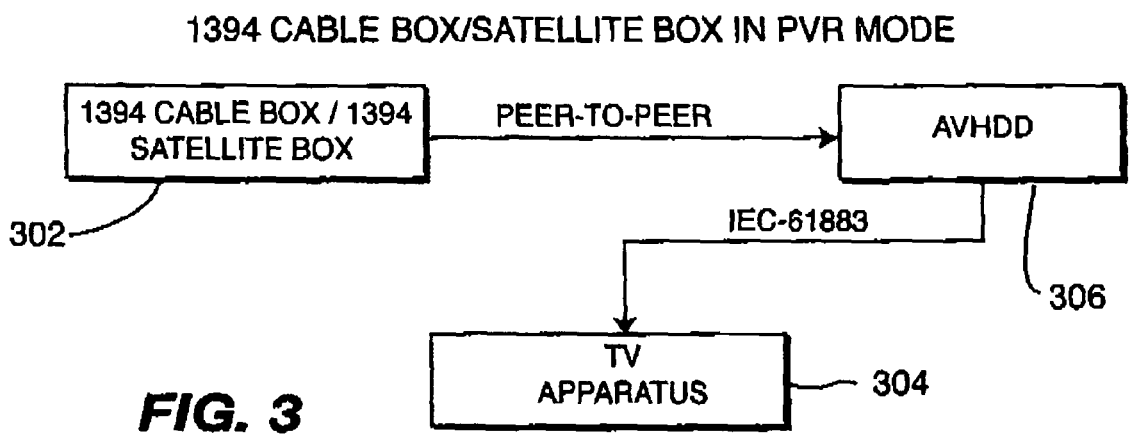
FIG. 3 is a block diagram illustrating the use of an IEEE 1394 compliant cable/satellite box in a PVR mode in accordance with the principles of the present invention.

FIG. 3 illustrates the situation where the cable/satellite box 302 is the TV digital content input source in the PVR mode. The television apparatus 304, in accordance with the present principles establishes a peer-to-peer connection between the IEEE 1394 compliant cable/satellite box 302 and an AVHDD 306. The IEC-61883 arrow represents the audio/video equipment digital interface protocol between the AVHDD 306 and the television apparatus 304.

Figure 4:
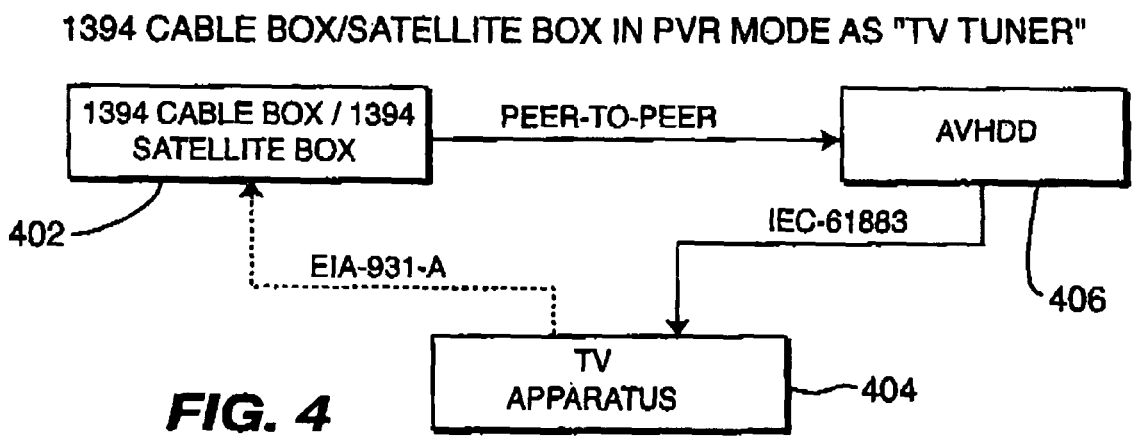
FIG. 4 is a block diagram illustrating the use of an IEEE 1394 compliant cable/satellite box in PVR mode as the TV tuner in accordance with the principles of the subject invention.

FIG. 4 illustrates the situation where the cable/satellite box 402 is the TV tuner (digital content input source) in the PVR mode. The television apparatus 404, in accordance with the present principles establishes a peer-to-peer connection between the IEEE 1394 compliant cable/satellite box 402 and an AVHDD 406. The IEC-61883 arrow represents the audio/video equipment digital interface protocol between the AVHDD 406 and the television apparatus 404. The EIA-931-A arrow represents the IEEE 1394 connection between the television apparatus 404 and the cable/satellite box 402.

The following descriptions provide operational details for the present PVR mode. It should be appreciated that these descriptions specify exemplary functionality for the PVR mode of the television apparatus according to the present invention.

[1] In order to create a pseudo-PVR mode with a connected AVHDD, continuous output of digital source content (terrestrial ATSC/digital cable), e.g. 2-way IEEE 1394, shall be supported and not just when a recording is initiated.

[2] The TV apparatus creates a temporary "live-TV" buffer in an AVHDD by continuously recording a digital channel (if the feature has been enabled in the "Recording Device" TV menu with the "High Continuous Recording" selection; the requirements in this section assume that "PVR Mode" is "on").

[3] The maximum temporary "live TV" buffer size is about 3.5 hours ATSC. So, the TV apparatus queries the drive for size, and if there is enough left, the TV apparatus will grab about 30.5 GB (which is 3.5 hours of ATSC full stream). If there is less, the TV apparatus will grab whatever is left. The amount of space that the TV apparatus grabs will be constant, i.e. the amount of recording time that can be fit in that space is bitrate dependent. (For example, with 30.5 GB, from many many hours of 480i ATSC data to 1.75 hours of 256QAM material).

[4] There is no minimum temporary "live TV" buffer limit.

[5] If the device is already full when the user plugs it in and selects it and PVR Mode is "on", then an alert panel is displayed so that the user knows that PVR mode is unavailable until they free up some space.

[6] The user will be allowed to fill up the whole disk in which case the "full disk" alert panel would appear.

[7] When the TV is first turned on, the TV shall establish a connection to the default recording device setup in the "Recording Device" screen (if the user has selected "High Continuous Recording" in that screen to enable PVR mode).

[8] After having first pressed RECORD, subsequently pressing STOP will save the video as a permanent track and a new "buffer track" is started at "Live" time.

[9] Pressing RECORD then STOP will save the entire temporary video buffer as a permanent track. This includes video that was recorded into the temp buffer BEFORE the user hit RECORD (i.e., video that was recorded into the temp buffer from the moment the user tuned a digital channel until the moment the user hit RECORD) and the X amount of time that is no data after STOP, since the space has to be pre-allocated. Electronic program guide (EPG) initiated recordings are cleaner in that they consume only enough space as necessary to record the program as the TV will not pre-allocate space on the AVHDD.

[10] If the temporary recording buffer is allowed to record to the end of its pre-allocated space, the beginning of the buffer (track) will be overwritten with new video content.

[11] When RECORD is pressed the location in the video at which the temporary buffer was started (i.e., the time that the digital channel was tuned) that location is marked as the start of the track.

[12] If the hard disk is "temporarily buffering" and the user is tuned to the IEEE 1394 input and the user presses STOP (without first pressing RECORD), then the STOP command is ignored.

[13] If the hard disk is "temporarily buffering" and the user is NOT tuned to the TV apparatus IEEE 1394 input and the user presses STOP (without first pressing RECORD), then the STOP command does not take the user to the PVR mode (i.e., the hard disk input), that is, STOP is ignored.

[14] If an EPG initiated recording of an analog channel is in progress and the user presses a transport key, then the VR mode won't be activated since the PVR mode doesn't apply to analog channels.

[15] If the remote is in TV mode, the TV is tuned to a digital channel, and "a valid transport key" is pressed, then the TV will go into "PVR mode".

[16] If the remote is in TV mode, the TV is tuned to an analog channel, and "a valid transport key" is pressed, then the TV will do nothing (except when RECORD is selected).

[17] If the remote is in TV mode, the TV is tuned to an analog channel, and RECORD is pressed, then a G-LINK recording is started, however, AutoTuning to the default digital recording device does not occur).

[18] When viewing an analog channel, pressing a transport key will never AutoTune to the default digital recorder (i.e., to PVR mode).

[19] "A valid transport key" which enables PVR mode for digital channels is defined as FORWARD, RECORD, REVERSE, PAUSE, LEFT ARROW (jump back 7 seconds), RIGHT ARROW (jump forward 30 seconds), and OK (LIVE)).

[20B] Transport keys and LEFT/RIGHT keys only autotune when tuned to the tuner, not when the TV is tuned to a line input.

[21] PLAY and STOP never enable PVR mode, however, they are passed to the default digital recorder.

[22] "PVR mode" is defined as "the TV "autotunes" to input where the default recording device selected in the Recording Device screen is connected [and user has chosen to enable automatic time-shift video buffer storage]" even if it is a DVCR and not an AVHDD.

[23] Even if the selected transport key cannot be applied "fully" under the circumstances (e.g., FORWARD when already live, RIGHT ARROW when already live, OK (LIVE) when already live, RIGHT arrow when the playback is less than 30 seconds behind live, LEFT arrow when there is less than 7 seconds stored in the buffer) the PVR mode is still enabled and the transport button's icon is still displayed immediately followed by the PLAY icon and playing the content in the temporary buffer.

[24] How channel tuning is handled in PVR mode: When watching Live TV, the TV is in continuous buffer mode>press a transport key>TV switches to the default recording IEEE 1394 device and begins PVR mode>user can do other transport commands in PVR mode >CH+/− goes through the subchannels on the current stream (major channel) and has no large delay in tuning>at last subchannel, pressing CH+/− will go to next major channel and stay on that IEEE 1394 input (tuning may take longer than tuning a subchannel, e.g., 2-3 seconds, and longer tune times than not being in PVR mode) >tuning to next major or minor channel will flush the temporary buffer.

[25] When in PVR mode, CH+/− only tunes the next digital subchannel or major channel. Analog channels are not tuned (i.e., they're skipped) when in PVR mode.

[26] If watching content from the TV tuner while in PVR mode and the user directly enters an analog channel number with the number keypad on the remote, then the TV exits PVR mode and displays the requested analog channel on the TV tuner.

[27] If watching either TV tuner or IEEE 1394 device like cable box, TV is in PVR mode, and the user directly enters a digital channel number with the number keypad on the remote, then the TV stays in PVR mode and displays the requested digital channel.

[28] CH+/− will always tune to the next subchannel (and clear ("flush") the temporary buffer).

[29] If user activates PVR mode and the program has the "copy-never" broadcast flag "attached" (or other form of copy protection), then the program cannot be temporarily buffered and the "Cannot Be Recorded" alert panel (which is used elsewhere in the TV) appears: "This program cannot be recorded because it is copy protected. Continue".

[30] Pressing LEFT ARROW when there is less than 7 seconds in the temporary buffer will still reverse the video to the beginning of the temporary buffer and start playing.

[31] Rewinding/reversing to the beginning of the temporary buffer will stop the rewind, and cause the AVHDD to start playing the video from the beginning of the temporary buffer.

[32] Turning off the TV (including via Sleep Timer) would keep any recordings going until they end; if no recordings are scheduled then the TV turns off and the temporary buffer is cleared.

[33] When the TV is locked and the user rewinds/forwards (or other method of transporting through the buffer), the TV blanks the audio+video+CC because the rating can only be monitored when the video is playing. Once the user resumes playing video, then the ratings check can be done and if necessary then the audio+video+CC is blanked and the "This program's rating has been blocked . . . ." OSD is displayed.

[34] The AVHDD records even if there is a Parental control block on that program/source. (This allows recording a program, even if the TV is locked. This is needed for the TV to do a timed recording when the TV is off and no one is present to unlock the TV.)

[35] Only the TV's tuners (and not inputs except for IEEE 1394 inputs) are available for temporary buffering and recording onto an AVHDD.

[36] "Go to LIVE" speed: OK button takes user to "realtime" video (i.e., video is no longer delayed).

[37] The OK key autotunes to "PVR mode" and goes to LIVE only when on the tuner (i.e. no autotuning if you are watching a LINE INPUT, even if you are recording from the tuner).

[38] The LIVE function is ignored when playing back a previously recorded program.

[39] If watching delayed video by less than 30 seconds, pressing RIGHT ARROW to jump ahead will go to Live video (instead of being disallowed and forcing the user to use FORWARD to get to Live).

[40] Invoking the EPG or the Menu shall not disrupt the position of the playback or continuous record buffer. That is, if watching delayed TV, pressing GUIDE shall show the Guide but shall not jump the program displayed in the EPG to live.

[41] If watching TV delayed (e.g., watching at "8:11" in an 8-9 PM show) and the program finishes its scheduled recording, the AVHDD shall not jump to live; it shall stay right where it is.

[42] Pressing LEFT ARROW when there is less than 7 seconds in the temporary buffer will still reverse the video to the beginning of the temporary buffer and start playing.

[43] Trick mode operation shall operate "normally" for both the primary or non-primary subchannels recorded as part of a complete transport stream recorded onto a digital storage medium.

[44] If a recording of a digital channel to a digital device is in progress and the user presses a VALID transport key, then PVR mode is activated since PVR mode applies only to digital channels.

[45] If a TV Guide recording of a digital channel is in progress and the TV is in PVR mode, and the user presses RECORD, the hard disk ignores the RECORD command because the hard disk is already recording.

[46] If a TV Guide recording-of a digital channel is in progress and the TV is in PVR mode, and the user presses STOP, the hard disk will stop a IEEE 1394 recording; by contrast, a G-LINK recording (AUDIO/VIDEO OUTPUT w/analog VCR) would keep going until the guide-designated program-stop time and STOP doesn't affect G-LINK recordings.

[47] When a TV Guide-initiated scheduled IEEE 1394 recording of a digital channel begins, the continuous buffer is flushed (cleared) and the recording starts at the scheduled time. That is to say that the user does not have a choice to also record anything in the buffer that existed prior to the start of the TV Guide-initiated scheduled recording.

[48] If the TV is tuned to an input which doesn't have transport-key passthrough (for example, an input with DVCR connected WOULD have DVCR passthrough; a baseband input would not have transport-key passthrough) and the user presses a transport key, the TV will go into PVR mode and display the last PVR'd device and digital channel.

[49] UP ARROW and DOWN ARROW only change tracks when the TV is in PVR mode and when the TV is playing back a permanent recording.

[50] UP ARROW and DOWN ARROW keys won't work in "TV-tuner mode" (e.g., not watching the DVR10 AVHDD) or "non-recordable-1394 input mode".

[51] When making a peer-to-peer connection for the currently connected/displayed device so that recordings can be done, since the video does not go through the TL945 for Peer-to-Peer connections, PID filtering cannot be supported.

[52] During PVR mode, "overshoot correction" compensates for users' reaction time. When reversing or forwarding, the correction applied at the time that PLAY is pressed is directly proportional to the speed at which the transport was traveling (i.e., the AVHDD backs up a little).

[53] When in IEEE 1394 playback mode and the user presses numeric keys on the remote (i.e., direct channel entry), that "direct-entered" subchannel will be tuned. A channel, which is entered and non-existent will be ignored.

[54] If in PVR-mode and the user wishes to go back to (true) LIVE, he can press the ANTENNA (ANT-CAB) key (or GO BACK) to switch back to the tuner and the buffer will NOT be flushed when the user does this.

[55] If we are in peer-to-peer PVR-mode (watching the playback of the cable box from the AVHDD), the user can only go back to the cable box device by having an autotune set up (in which case the buffer is not flushed) or use the INPUT key to cycle through all sources and devices to get back to the cable box (in which case the buffer could possibly be flushed on the way back to the cable box if the TV apparatus passes through any devices that invoke a PVR Mode).

[56] If the TV apparatus is in peer-to-peer PVR-mode (watching the playback of the cable box from the AVHDD), and the user has started a permanent recording but has not yet marked the end and he tries to go back to the cable box device, the TV shall give the "change channel warning".

[57] If we are doing a peer-to-peer recording (permanent or PVR, but watching the source) and the user switches inputs to a recordable device, the result of switching to another IEEE 1394 device or to the tuner is that the peer-to-peer connection that existed has now been broken.

[58] If the user is watching the tuner and he tries to go to the PVR device by input switching, as soon as he hits a non-recordable IEEE 1394 device, the TV apparatus will attempt to start the PVR Mode on this device.

[59] Pressing a transport key that autotunes is NOT the only way to access PVR-mode: the user could use INPUT to go to the PVR device, in which case the PVR device would show the last TV tuner or non-recordable IEEE 1394 tuner (e.g., IEEE 1394 cable box).

[60] If the user presses record while in PVR mode (to start a permanent recording from the continuous buffer), and then proceeds to watch enough data to make that record point be overwritten, the TV will stop the record and save the entire buffer when it gets to this point.

[61] Scenario: If there's an hour left on the drive, the user buffers 45 minutes, presses RECORD because he wants to convert the 45-min temp buffer to a permanent record, and he presses STOP, then an alert panel is displayed. After displaying the alert panel, permanently write only the start of the buffer until what's available to give them without sacrificing any space from the 30 min temporary continuous buffer.

[62] Some menus allow a user to switch inputs inside the menu (such as the picture settings menu). In these cases, don't change the current PVR source (if the user input cycle to IEEE 1394 in the menu and the device that is selected is the IEEE 1394 cable box). In this case, keep PVRing on the device that the TV apparatus entered the menu on (i.e. the Tuner).

[63] If the user changes the Signal Source menu, the TV will only switch the current PVR source if the user clears the menu on a different PVRable device than the one that he entered the menu on.

[64] If PVR functionality is turned OFF and the AVHDD is being watched and then the user turns PVR functionality ON, the AVHDD will start buffering the last-used tuner.

[65] If the AVHDD is in "PVR mode" but is watching a pre-recorded track (e.g., Track 6), then the user presses CH+/−, what will happen is that the AVHDD will tune to the channel within that track and wrap around to the next channel at the beginning or end.

[66] If a permanent (P2P) recording from the IEEE 1394 cable box to the DVR ends, the TV should then stay on the DVR and start a continuous recording between the two devices.

[67] If the TV apparatus is currently doing a recording and a user attempts a permanent recording on a different device, then start a recording on that different device and stop that previous recording that the TV apparatus was already doing. On the "different device", the TV apparatus will be recording the last-tuned source.

[68] If no recording is going on, the TV apparatus will set up to currently record, and the user switches to a device other than the default device and presses RECORD, then the TV apparatus will record from the last P2P device or tuner that we were on.

Moreover, the following describes the features and/or functionality of exemplary menus for the present invention. These descriptions specify exemplary functionality for the PVR mode of the television apparatus and are presented in a "list" format.

[1] The "Recording Device" screen is the screen that is used to tell the TV which of the transport-capable devices discovered on the IEEE 1394 network (if there is more than one) to send transport commands to when an IEEE 1394 device is not currently being tuned.

[2] The "Recording" Device screen specifies the IEEE 1394-recording device (e.g., HDD) that should be autotuned when a valid transport button (as defined in the section "PVR (Personal Video Recorder) Mode") is pressed on the remote in TV mode while viewing a digital channel or input.

[3] In this screen, only discovered IEEE 1394 devices that are capable of IEEE 1394 recording (e.g., AVHDD and D-VHS) are displayed in the choice field.

[4] If a recordable IEEE 1394 device is detected, then the choice field is displayed with the following string above it:
"Select which digital device should record when RECORD is pressed while watching a digital program:"

[5] If a recordable IEEE 1394 device is detected, then a radio button list appears with:
"Yes/No" choices and the following text header:
"Select a functionality level for the above device:"

[6] The three radiobutton selections are:
"Use it as the default recording device.
(Best choice if a DVCR is the default device)"
"Use it as the default recording device, and autotune the TV to that device when RECORD is pressed."
(Best if you don't want continuous video buffering)
"Continuously buffer digital programs to it, and autotune the TV to that device when any transport key is pressed.
(Best for time-shifting programs (e.g. pause with AVHDD))"

[7] Selecting the "Low" choice from the list will not autotune to the default recording device with any transport key. RECORD will still be passed through to the default recording device.

[8] Selecting the "Med." choice from the list will allow autotuning to the default recording device only with the RECORD button. RECORD is passed through to the default recording device.

[9] Selecting the "High" choice from the list will allow autotuning to the default recording device with any of the transport keys, and the device will continuously record (save a time-shift buffer) digital programs on the default recording device.

[10] If there are no discovered IEEE 1394 recording devices available, then the "Select which . . ." text string at the top does not appear and instead a text string (FRW_RCRD_NODEVICE_STR) appears which reads:
The TV does not detect a selectable DTVLink recording device (for example, a hard disk drive or digital VCR).

[11] If there are no discovered IEEE 1394 recording devices available, then the choice field and radio button list do not appear.

[12] If there is more than one discovered IEEE 1394 digital recording device and the user has not made a selection, the default selected device is the "first" (by model number) device, regardless of the type of the device.

[13] If there is only 1 discovered IEEE 1394 digital recording device, then it is the default-selected device (regardless of whether it is an AVHDD or a D-VCR).

[14] If the user sets his default digital recording device to "Off" or if the default digital recording device is not connected on the network, then when user presses RECORD from outside of the guide while tuned to a digital or analog program, an analog recording will be made to the VCR set up in TV Guide setup (which is the same device selected in TV Guide's Record Defaults "Destination" field [see page 85 of TV Guide UI Spec]) via G-LINK IR blasting and VIDEO OUTPUT.

[15] If the user has chosen a particular target device from the list of devices in the screen, then later the device disappears from the network, valid commands would "go to the first device in the list".

[16] If a chosen device becomes disconnected then the first device in the sorted list now becomes the default device, and even if the previous user-selected device comes back online it is made the default device.

[17] When the user selects to turn "Off" IEEE 1394 Recording, the radio button list and text header are not displayed.

[18] If a device is selected in the "device selection" choice field (i.e., not set to "Off"), a radio button list appears beneath the choice field.

[19] The radio button list for the "Recording Device" screen defaults to "High".

[20] If no 1394 device is detected on bootup and the user inserts an AVHDD into the mix at some later time, the Recording Device screen will update automatically the next time the user opens it. Automatically start recording (PVR) to the AVHDD even if the user has never gone into the Recording Device screen to set it up.

[21] If the user has a device on the network but chooses to turn PVR functionality off in the Recording Device screen, and then the user adds a new AVHDD to the network, the screen will NOT change from "Off" to the new device: once the user chooses Off, the TV will honor that regardless of the addition of new AVHDDs after that.

[22] If the user selects a DVCR, the UI chooses that first option for him. (Not preventing him from selecting the other two, but the other two don't make sense with a DVCR.) If he chooses an AVHDD, we can choose the third option.

[23] Changes to RECORDING DEVICE menu should have an immediate effect; i.e., the change should be acted upon as soon as user leaves the menu.

Figure 5:
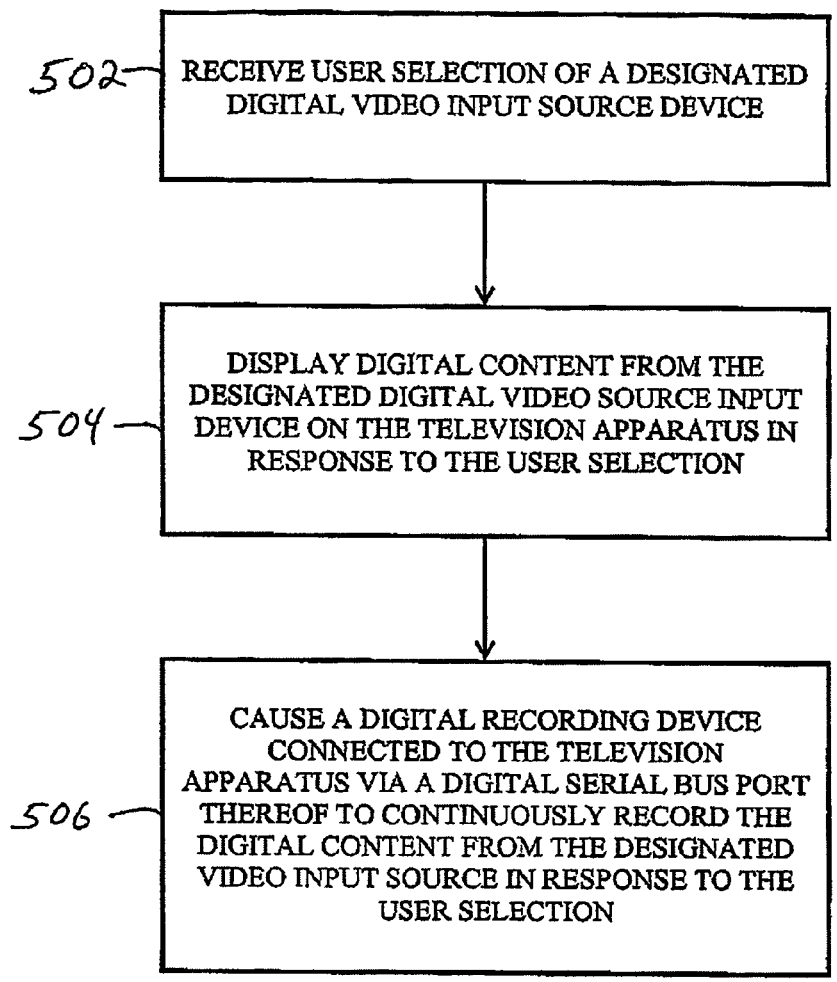
FIG. 5 is a flowchart of an exemplary manner of operation of the present invention.

Referring to FIG. 5, there is depicted a flowchart, generally designated 500, of an exemplary manner of operation of the television apparatus 22 in accordance with the present principles. The flowchart 500 assumes that the PVR mode is enabled. In block 502 the television apparatus receives user selection of a designated digital content input source (from the various available digital content input sources such as the digital TV tuner or one or more digital serial bus, e.g. IEEE 1394, compliant digital content peripherals, components, or devices). Thereafter, in block 504, the television apparatus displays the digital content from the designated digital video source input device on the television apparatus in response to the user selection. Then, in block 506, the television apparatus causes a digital recording device connected to the television apparatus via one of the digital serial bus ports (e.g. IEEE 1394 ports) thereof to continuously record the digital video content from the designated video input source in response to the user selection.

Figure 6:
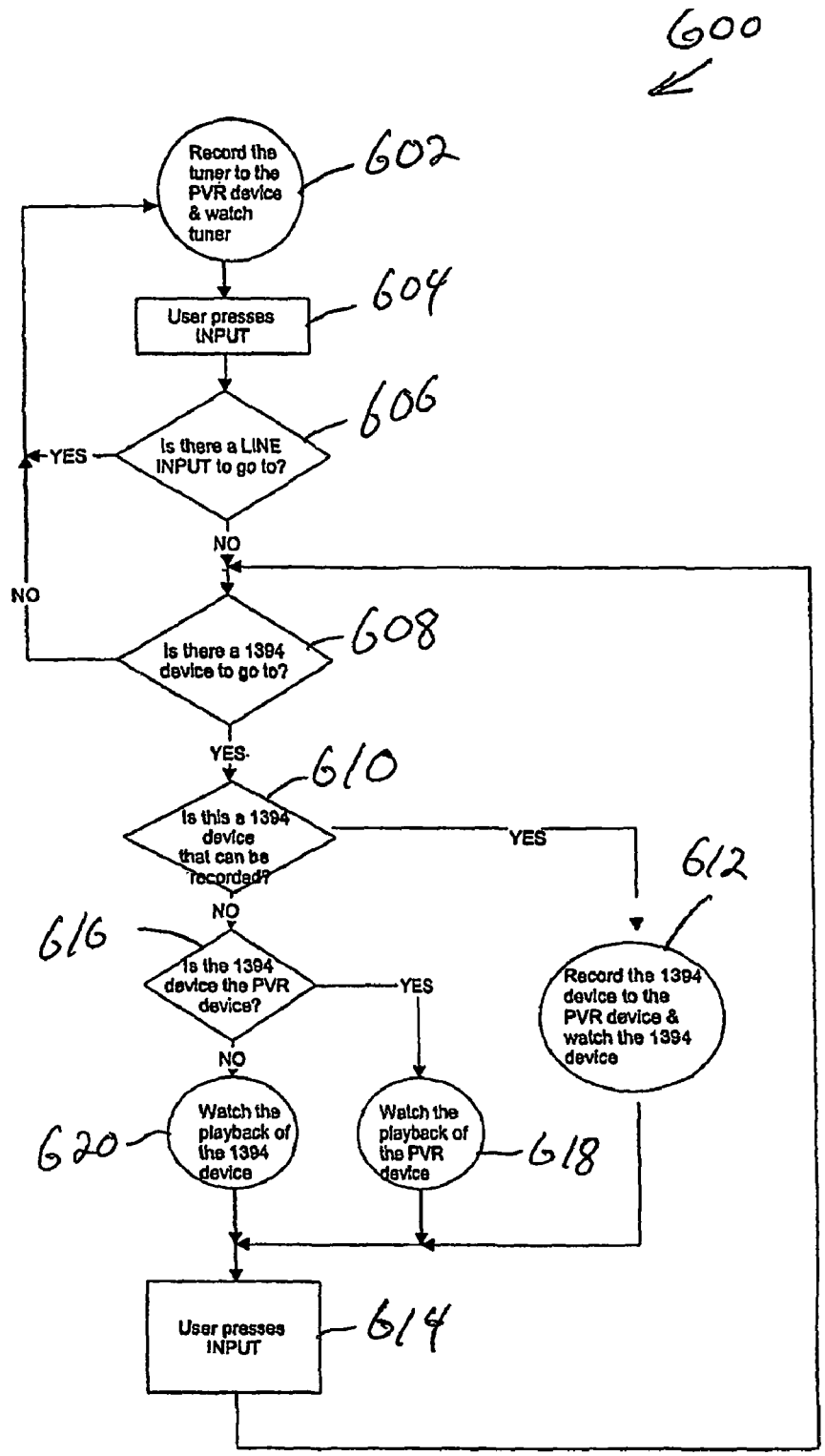
FIG. 6 is a flowchart of another exemplary manner of operation of the present invention.

Referring to FIG. 6, there is depicted a flowchart, generally designated 600, of another exemplary manner of operation of the television apparatus 22 in accordance with the present principles. The flowchart 600 assumes that the PVR feature has been enabled. In block 602, the television apparatus causes the digital content from the digital tuner of the television apparatus to be recorded onto the selected or default PVR device (i.e. the digital serial bus recording component) while also providing the digital content from the selected digital content source input for display. The recording of the TV tuner is the default mode. The television apparatus also allows the user to designate the digital content input source. As such, block 604 provides for user input (e.g. an INPUT from the television remote). In block 606 it is determined whether there is a LINE INPUT (LINE IN) to go to. If so (i.e. YES), then program flow goes back to block 602.

If, however, there is no LINE INPUT to go to (i.e. NO), then program flow continues to block 608. In block 608 it is determined whether there is an IEEE 1394 (IEEE 1394 or other digital serial bus) digital source input connected to the television apparatus. If there is none (i.e. NO), then program flow goes back to block 602. If there is a 1394 device connected to the television apparatus, it is determined whether the 1394 device is a 1394 device that can be recorded. If so, (i.e. YES), the in step 612, the 1394 device is recorded to the PVR device and displayed on the television apparatus. Thereafter, in block 614, the television apparatus waits for user input.

If, however, the IEEE 1394 device of block 610 is not recordable (i.e. NO), then the program determines whether the IEEE 1394 device is the PVR device. If the 1394 device is the PVR device (i.e. YES), then in block 618, playback of the PVR device is displayed. Again, thereafter, in block 614, the television apparatus waits for user input. If the 1394 device is not the PVR device (i.e. NO), then 1394 device is watched. Again, thereafter, in block 614, the television apparatus waits for user input.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

The invention claimed is:

1. A method for operating a television apparatus having a digital serial bus connection and one or more other connections to enable a recording function, the method comprising the steps of:
   receiving, by the television apparatus, a user input;
   detecting, by the television apparatus, if a video input source device corresponding to one of the other connections is available in response to the user input;
   if a video input source device corresponding to one of the other connections is available, causing, by the television apparatus, a digital recording device to record digital content provided from the video input source device corresponding to one of the other connections in response to the user input;
   if a video input source device corresponding to one of the other connections is not available, detecting, by the television apparatus, if a video input source device corresponding to the digital serial bus connection is available;
   if a video input source device corresponding to the digital serial bus connection is available, performing steps comprising:
   establishing, by the television apparatus, a peer-to-peer connection between the video input source device corresponding to the digital serial bus connection and the digital recording device in response to the user input; and
   causing, by the television apparatus, the digital recording device to record digital content provided from the video input source device corresponding to the digital serial bus connection in response to the user input, wherein data is directly transferred between the video input source device corresponding to the digital serial bus connection and the digital recording device.

2. The method of claim 1, wherein the user input includes a user pressing a single key of a remote control device.

3. The method of claim 2, wherein the digital serial bus comprises an IEEE 1394 compliant bus.

4. The method of claim 2, further comprising:
   causing the digital recording device to continuously record video content provided from a tuning device of the television apparatus in response to user selection of the tuning device as a designated video input source device.

5. The method of claim 4, wherein the causing step comprises causing the digital recording device to continuously record the video content provided from the tuning device of the television apparatus into a predefined buffer size of a storage medium of the digital recording device.

6. The method of claim 2, further comprising the step of displaying video content stored on the digital recording device on a display device associated with the television apparatus in response to user selection of the digital recording device as a designated video input source device.

7. A television apparatus having a digital serial bus connection and one or more other connections, the television apparatus comprising:
   first means for receiving a user input;
   second means for detecting if a video input source device corresponding to one of the other connections is available in response to the user input;
   wherein if a video input source device corresponding to one of the other connections is available, the second means causes a digital recording device to record digital content provided from the video input source device corresponding to one of the other connections in response to the user input;
   wherein if a video input source device corresponding to one of the other connections is not available, the second means detects if a video input source device corresponding to the digital serial bus connection is available;
   wherein if a video input source device corresponding to the digital serial bus connection is available, the second means enables steps comprising:
   establishing a peer-to-peer connection between the video input source device corresponding to the digital serial bus connection and the digital recording device in response to the user input; and
   causing the digital recording device to continuously record digital content provided from the video input source device corresponding to the digital serial bus connection in response to the user input, wherein data is directly transferred between the video input source device corresponding to the digital serial bus connection and the digital recording device.

8. The television apparatus of claim 7, wherein the user input includes a user pressing a single key of a remote control device.

9. The television apparatus of claim 8, wherein the digital serial bus comprises an IEEE 1394 compliant bus.

10. The television apparatus of claim 8, wherein the second means comprises means for causing the digital recording device to continuously record video content from a tuning device of the television apparatus in response to user selection of the tuning device as a designated video input source device.

11. The television apparatus of claim 10, wherein the means for causing causes the digital recording device to continuously record the video content from the tuning device of the television apparatus into a predefined buffer size of a storage medium of the digital recording device.

12. The television apparatus of claim 8, further comprising means for displaying video content stored on the digital recording device in response to user selection of the digital recording device as a designated video input source device.

13. A method for operating a television apparatus having a digital serial bus connection and one or more other connections to enable a recording function, the method comprising the steps of:

receiving, by the television apparatus, a user input;

in response to the user input, detecting, by the television apparatus, if a video input source device corresponding to one of the other connections is available;

if a video input source device corresponding to one of the other connections is available, causing, by the television apparatus, a digital recording device to record digital content provided from the video input source device corresponding to one of the other connections in response to the user input;

if a video input source device corresponding to one of the other connections by the television a apparatus, if a video input source device is not available, detecting, by the television apparatus, if a video input source device corresponding to the digital serial bus connection is available;

if a video input source device corresponding to the digital serial bus connection is available, performing steps comprising:

establishing, by the television apparatus, a peer-to-peer connection between the digital video input source device corresponding to the digital serial bus connection and the digital recording device in response to the user input;

displaying, by the television apparatus, digital content provided from the digital video input source device corresponding to the digital serial bus connection on a display device associated with the television apparatus in response to the user input; and causing, by the television apparatus, the digital recording device to continuously record the digital content provided from the digital video input source device corresponding to the digital serial bus connection in response to the user input, wherein data is directly transferred between the digital video input source device corresponding to the digital serial bus connection and the digital recording device.

14. The method of claim 13, further comprising the step of:

causing the digital recording device to continuously record video content from a digital tuning device of the television apparatus in response to user selection of the digital tuning device as a designated digital video input source device.

15. The method of claim 14, wherein the causing step comprises causing the digital recording device to continuously record the video content from the digital tuning device of the television apparatus into a predefined buffer size of a storage medium of the digital recording device.

16. The method of claim 13, wherein the user input includes a user pressing a single key of a remote control device.

* * * * *